(12) United States Patent
Myeong et al.

(10) Patent No.: US 8,315,734 B2
(45) Date of Patent: Nov. 20, 2012

(54) ROBOT AND METHOD AND MEDIUM FOR LOCALIZING THE SAME BY USING CALCULATED COVARIANCE

(75) Inventors: Hyeon Myeong, Yongin-si (KR); Yong-beom Lee, Yongin-si (KR); Seok-won Bang, Yongin-si (KR); Hyoung-ki Lee, Yongin-si (KR); Ki-wan Choi, Yongin-si (KR); Eun-young Choe, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1251 days.

(21) Appl. No.: 11/688,983

(22) Filed: Mar. 21, 2007

(65) Prior Publication Data
US 2007/0244600 A1  Oct. 18, 2007

(30) Foreign Application Priority Data

Apr. 4, 2006  (KR) .................. 10-2006-0030654

(51) Int. Cl.
*G06F 19/00*  (2011.01)
(52) U.S. Cl. ......... 700/245; 700/250; 700/253; 700/258
(58) Field of Classification Search .................. None
See application file for complete search history.

(56) References Cited

U.S. PATENT DOCUMENTS

| | | | |
|---|---|---|---|
| 6,278,906 B1* | 8/2001 | Piepmeier et al. ............ | 700/250 |
| 2004/0158354 A1* | 8/2004 | Lee et al. .................... | 700/245 |
| 2004/0168148 A1* | 8/2004 | Goncalves et al. .......... | 717/104 |
| 2007/0106423 A1* | 5/2007 | Myeong et al. .............. | 700/245 |

FOREIGN PATENT DOCUMENTS

| | | |
|---|---|---|
| JP | 5-2403 | 1/1993 |
| KR | 10-2004-0007538 | 1/2004 |
| KR | 10-2004-0060829 | 7/2006 |

OTHER PUBLICATIONS

Schlemmer, M; on-line trajectory optimization for kenematic redundant robot manipulation and avoidance of moving obstacles; Apr. 22-28, 1996; IEEE robotics and automation proceedings; vol. 1; pp. 474-479.*
Korean Office Action dated May 29, 2012 issued in corresponding Korean Patent Application No. 10-2006-0030654.
"Evolutionary Programming-Based Field Navigation Method for Fast Mobile Robots", Yong-Jae Kim et al, IEEE Transactions on Systems, Man, and Cybernetics—Part B: Cybernetics, vol. 31, No. 3, Jun. 2001, pp. 450-458.

* cited by examiner

*Primary Examiner* — Khoi Tran
*Assistant Examiner* — Bhavesh V Amin
(74) *Attorney, Agent, or Firm* — Staas & Halsey LLP

(57) ABSTRACT

Provided are a robot capable of improving the computation rate by considering whether a parameter will diverge and modifying the experiment order of offspring during evolutionary computation, when the covariance of system noise and that of measurement noise are calculated for the purpose of localizing the robot by using a Kalman filter, and a method and medium of localizing a robot by using a calculated covariance. The robot includes a gyroscope module providing information regarding rotational angle; an encoder module providing information regarding velocity and information regarding rotational angle of a wheel by sensing motion of the wheel; and a control module estimating a current location according to a Kalman filter method based on information provided by the encoder module and the gyroscope module, a covariance of system noise and a covariance of measurement noise being calculated in an evolutionary computation and applied to the Kalman filter method by the control module, the covariance of system noise and the covariance of measurement noise satisfying a condition that no Kalman filter parameter diverges in the evolutionary computation.

24 Claims, 7 Drawing Sheets

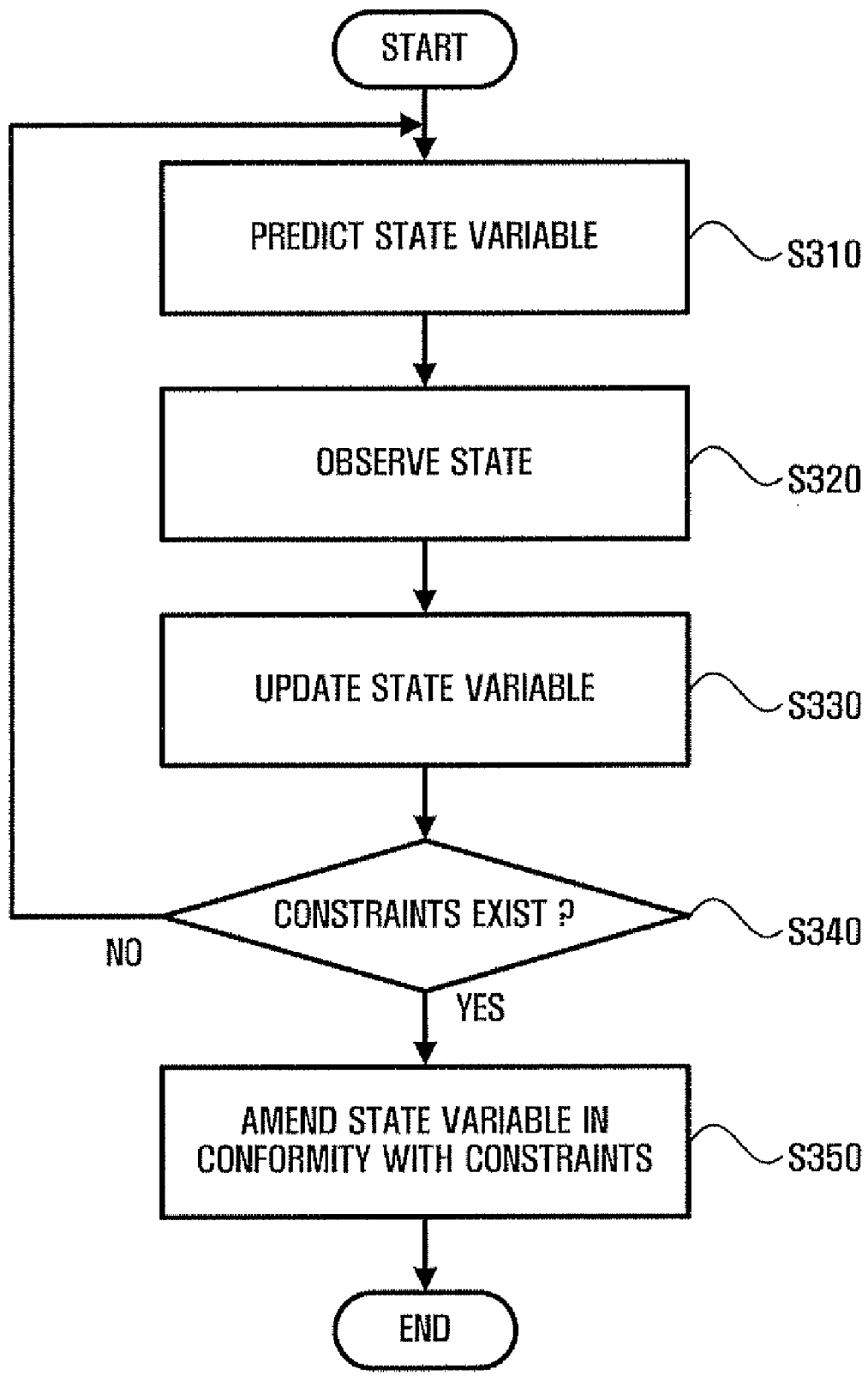

FIG. 4

$$\begin{bmatrix} \delta X(k+1) \\ \delta Y(k+1) \\ \delta X_G(k+1) \\ \delta Y_G(k+1) \\ \delta \psi(k+1) \\ S_R(k+1) \\ S_L(k+1) \\ \delta D(k+1) \\ \delta \phi(k+1) \\ \delta B_S(k+1) \\ \delta B_{rb}(k+1) \end{bmatrix} = \underbrace{\begin{bmatrix} 1 & 0 & 0 & 0 & -\sin\psi(k)\frac{U_R+U_L}{2} & \cos\psi(k)\frac{U_R}{2} & \cos\psi(k)\frac{U_L}{2} & 0 & 0 & 0 & 0 \\ 0 & 1 & 0 & 0 & \cos\psi(k)\frac{U_R+U_L}{2} & \sin\psi(k)\frac{U_R}{2} & \sin\psi(k)\frac{U_L}{2} & 0 & 0 & 0 & 0 \\ 0 & 0 & 1 & 0 & -\sin\phi(k)\frac{U_R+U_L}{2} & \cos\phi(k)\frac{U_R}{2} & \cos\phi(k)\frac{U_L}{2} & 0 & 0 & 0 & 0 \\ 0 & 0 & 0 & 1 & \cos\phi(k)\frac{U_R+U_L}{2} & \sin\phi(k)\frac{U_R}{2} & \sin\phi(k)\frac{U_L}{2} & 0 & 0 & 0 & 0 \\ 0 & 0 & 0 & 0 & 1 & \frac{U_R}{D} & -\frac{U_L}{D} & \frac{U_L-U_R}{D^2} & 0 & 0 & 0 \\ 0 & 0 & 0 & 0 & 0 & 1 & 0 & 0 & 1 & 0 & 0 \\ 0 & 0 & 0 & 0 & 0 & 0 & 1 & 0 & 1 & 0 & 0 \\ 0 & 0 & 0 & 0 & 0 & 0 & 0 & 1 & 0 & 0 & 0 \\ 0 & 0 & 0 & 0 & 0 & 0 & 0 & 0 & 1 & 0 & 0 \\ 0 & 0 & 0 & 0 & 0 & 0 & 0 & 0 & \Omega & 1 & 0 \\ 0 & 0 & 0 & 0 & 0 & 0 & 0 & 0 & 1 & 0 & 1 \end{bmatrix}}_{A} \begin{bmatrix} \delta X(k) \\ \delta Y(k) \\ \delta X_G(k) \\ \delta Y_G(k) \\ \delta \psi(k) \\ S_R(k) \\ S_L(k) \\ \delta D(k) \\ \delta \phi(k) \\ \delta B_S(k) \\ \delta B_{rb}(k) \end{bmatrix} + w$$

$$Z = \begin{bmatrix} \hat{X}(k) - \hat{X}_G(k) \\ \hat{Y}(k) - \hat{Y}_G(k) \\ \hat{\psi}(k) - \hat{\phi}(k) \end{bmatrix} + v = \begin{bmatrix} \delta\hat{X}(k) - \delta\hat{X}_G(k) \\ \delta\hat{Y}(k) - \delta\hat{Y}_G(k) \\ \delta\hat{\psi}(k) - \delta\hat{\phi}(k) \end{bmatrix} + v$$

$$= \begin{bmatrix} 1 & 0 & -1 & 0 & 0 & 0 & 0 & 0 & 0 & 0 & 0 \\ 0 & 1 & 0 & -1 & 0 & 0 & 0 & 0 & 0 & 0 & 0 \\ 0 & 0 & 0 & 0 & 1 & 0 & 0 & 0 & -1 & 0 & 0 \end{bmatrix} \begin{bmatrix} \delta X(k) \\ \delta Y(k) \\ \delta X_G(k) \\ \delta Y_G(k) \\ \delta \psi(k) \\ S_R(k) \\ S_L(k) \\ \delta D(k) \\ \delta \phi(k) \\ \delta B_S(k) \\ \delta B_{rb}(k) \end{bmatrix} + v$$

$$Z = \hat{\psi}(k) - \hat{\phi}(k) + v = \delta\psi(k) - \delta\phi(k) + v$$

$$= \begin{bmatrix} 0 & 0 & 1 & 0 & 0 & 0 & -1 & 0 & 0 \end{bmatrix} \begin{bmatrix} \delta X(k) \\ \delta Y(k) \\ \delta \psi(k) \\ S_R(k) \\ S_L(k) \\ \delta D(k) \\ \delta \phi(k) \\ \delta B_S(k) \\ \delta B_{rb}(k) \end{bmatrix} + v$$

$$\Downarrow$$

H

ROBOT AND METHOD AND MEDIUM FOR LOCALIZING THE SAME BY USING CALCULATED COVARIANCE

CROSS-REFERENCE TO RELATED APPLICATIONS

This application claims the benefit of Korean Patent Application No. 10-2006-0030654 filed on Apr. 41, 2006 in the Korean Intellectual Property Office, the disclosure of which is incorporated herein by reference in its entirety.

BACKGROUND OF THE INVENTION

1. Field of the Invention

The present invention relates to a robot and method and medium for localizing a robot by using a calculated covariance. More particularly, the present invention relates to a robot capable of improving the computation rate by considering whether a parameter will diverge and modifying the experiment order of offspring during evolutionary computation, when the covariance of system noise and that of measurement noise are calculated for the purpose of localizing the robot by using a Kalman filter, and a method and medium of localizing a robot by using a calculated covariance.

2. Description of the Related Art

Various types of robots have recently appeared as a result of research and development. Particularly, there are robots capable of moving inside a house by themselves for household labor.

Self-localization of mobile robots is a very important issue, and many methods have been proposed to address this.

In order to localize a robot, it is customary to attach an encoder (or odometer) to a driving unit (e.g., a wheel) of the robot or mount a gyroscope onto the robot in order to measure the correct rotational angle of the robot.

However, slip or mechanical drift of a wheel, when a robot is localized, causes error. Although such error may be negligible at first, it may accumulate and cause a problem.

A Kalman filter algorithm is conventionally used to localize a robot. However, the performance of the robot depends on the setting of covariance of system noise of the Kalman filter and that of measurement noise.

Methods of calculating the covariance of system noise and that of measurement noise includes a trial-and-error method, an on-line update method, and an evolutionary computation method. According to the trial-and-error method, various values are inputted as the covariance of system noise and that of measurement noise, and a value having the highest efficiency is selected. However, the trial-and-error method has a problem in that its efficiency may vary depending on the values inputted by the experimenter.

According to the evolutionary computation method, the covariance of system noise and that of measurement noise are calculated by measuring the error of a Kalman filter value, based on a true value obtained from experimental data in advance, and minimizing the error. However, the evolutionary computation method has a problem in that it requires a long computation time, because computation must be performed for each individual's objective function.

For example, when there are 30 individuals, 80 generations, and 40 kinds of experiments, and the computation time for a single experiment is 1 second, necessary computation time T is defined by equation (1) below.

$$T = (1 \text{ second}/1 \text{ trial}) \times 40 \times 30 \times 80 = 96,000 \text{ sec} = 26.7 \text{ hour} \quad (1)$$

Korean Laid-open Patent Publication No. 2004-060829 discloses a robot localization system, which is characterized in that it includes a Kalman filter for filtering the measurement noise of an absolute azimuth measurement unit. However, the disclosed invention does not propose any method for calculating the covariance of measurement noise. Particularly, the system uses a value specific thereto. Therefore, the covariance of measurement noise must be newly calculated every time the system is modified. As a result, the system efficiency degrades, and it requires a long computation time to calculate the covariance of measurement noise.

Therefore, it is requested to shorten the computation time necessary to calculate the covariance of system noise and that of measurement noise.

SUMMARY OF THE INVENTION

Accordingly, the present invention has been made to solve the above-mentioned problems occurring in the prior art, and an object of the present invention is to avoid unnecessary computations, when the covariance of system noise and that of measurement noise are calculated through evolutionary computation, by restricting the computation to offspring, which do not cause any Kalman filter parameter to diverge.

Another aspect of the present invention avoids unnecessary computations when experiments are performed to calculate the error of a Kalman filter value with regard to a true value, by calculating the error regarding a previous experiment, which has undergone divergence, at the beginning of the next experiment process.

In an aspect of the present invention, there is provided a robot including a gyroscope module providing information regarding a rotational angle; an encoder module providing information regarding velocity and information regarding rotational angle of a wheel by sensing motion of the wheel; and a control module estimating a current location according to a Kalman filter method based on information provided by the encoder module and the gyroscope module, a covariance of system noise and a covariance of measurement noise being calculated in an evolutionary computation and applied to the Kalman filter method by the control module, the covariance of system noise and the covariance of measurement noise satisfying a condition that no Kalman filter parameter diverges in the evolutionary computation.

In accordance with another aspect of the present invention, there is provided a method of localizing a robot by using a calculated covariance, the method including (a) providing information regarding rotational angle; (b) providing information regarding velocity and information regarding rotational angle of a wheel by sensing motion of the wheel; and (c) estimating a current location according to a Kalman filter method based on information provided in (a) and (b), a covariance of system noise and a covariance of measurement noise being calculated in an evolutionary computation and applied to the Kalman filter method, the covariance of system noise and the covariance of measurement noise satisfying a condition that no Kalman filter parameter diverges in the evolutionary computation.

In accordance with another aspect of the present invention, there is provided a robot including a gyroscope module to provide rotational angle information of the robot; an encoder module to provide velocity information and information related to rotational angle of a wheel by sensing motion of the wheel; and a control module to estimate a current location according to a Kalman filter, to which a covariance of system noise and measurement noise calculated in an evolutionary computation are applied, based on the rotational angle information of the robot, velocity information, and information related to rotational angle of the wheel, wherein the control module applies the covariance of system noise and measurement noise to the Kalman filter in order to satisfy a condition where no Kalman filter parameter diverges in the evolutionary computation.

In accordance with another aspect of the present invention, there is provided a method of localizing a robot by using a calculated covariance, including (a) providing rotational angle information of the robot; (b) providing velocity information and information relating to rotational angle of a wheel by sensing motion of the wheel; and (c) estimating a current location according to a Kalman filter, to which a covariance of system noise and measurement noise calculated in an evolutionary computation are applied, based on rotational angle information of the robot, velocity information, and information related to rotational angle of the wheel, wherein the covariance of system noise and measurement noise are applied to the Kalman filter in order to satisfy a condition where no Kalman filter parameter diverges in the evolutionary computation.

In accordance with another aspect of the present invention, there is provided a robot including a control module to estimate a current location according to a Kalman filter, to which a covariance of system noise and measurement noise calculated in an evolutionary computation are applied, based on rotational angle information of the robot, velocity information, and information related to rotational angle of the wheel, wherein the control module applies the covariance of system noise and measurement noise to the Kalman filter in order to satisfy a condition where no Kalman filter parameter diverges in the evolutionary computation.

According to another aspect of the present invention, there is provided at least one computer readable medium storing computer readable instructions to implement methods of the present invention.

Additional aspects, features, and/or advantages of the invention will be set forth in part in the description which follows and, in part, will be apparent from the description, or may be learned by practice of the invention.

BRIEF DESCRIPTION OF THE DRAWINGS

Aspects, features, and advantages of the invention will become apparent and more readily appreciated from the following description of exemplary embodiments, taken in conjunction with the accompanying drawings of which:

FIG. 3 is a flowchart showing a Kalman filtering process according to an exemplary embodiment of the present invention;

FIG. 4 shows a state equation of a Kalman filter according to an exemplary embodiment of the present invention;

FIG. 5 shows a measurement equation of a Kalman filter according to an exemplary embodiment of the present invention;

FIG. 6 shows a measurement equation of a conventional Kalman filter; and

DETAILED DESCRIPTION OF THE PREFERRED EMBODIMENTS

Figure 1:
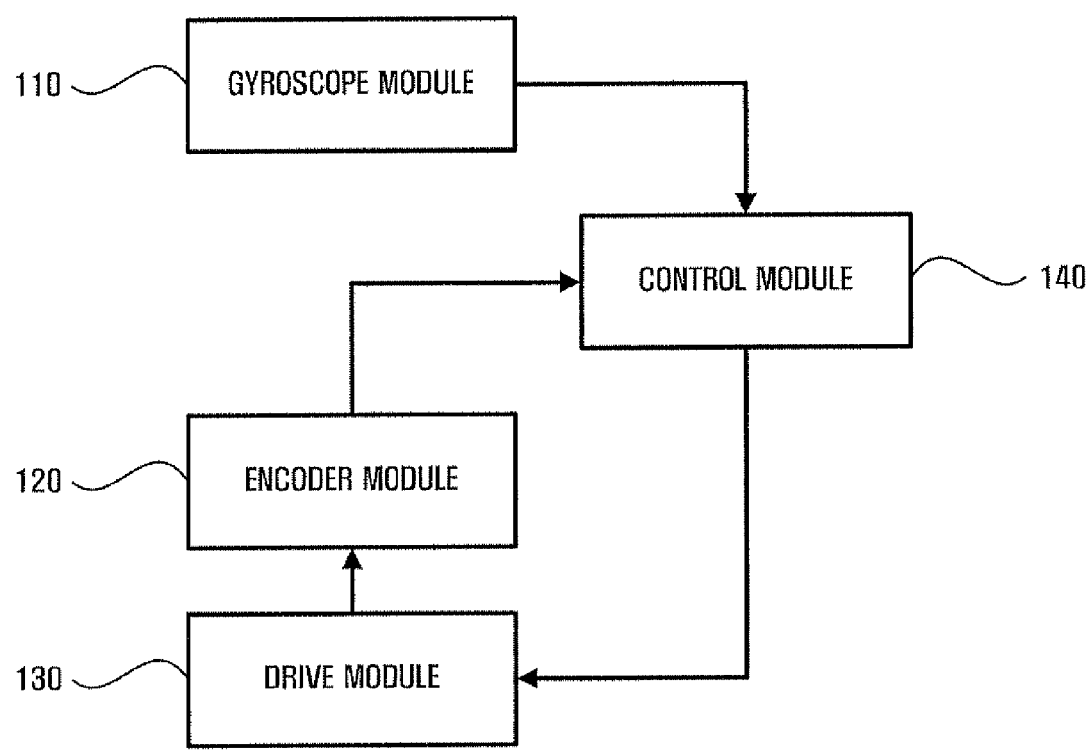
FIG. 1 is a block diagram showing the construction of a robot according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram showing the construction of a robot according to an exemplary embodiment of the present invention. The robot includes a gyroscope module 110, an encoder module 120, a drive module 130, and a control module 140.

The term "module", as used herein, denotes, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Furthermore, components and modules may be implemented so as to regenerate one or more CPUs inside a device or security multimedia card.

In addition, "robot" as used herein, refers to an object adapted to localize itself by using a gyroscope and encoders.

The gyroscope module 110 is attached to a mobile robot and provides information (values) regarding the rotational angle of the gyroscope.

The encoder module 120 senses the motion of the driving module 130, which includes wheels, and provides information (values) regarding the velocity of the mobile robot and the rotational angle of the wheels.

The control module 140 localizes the mobile robot based on the information (values) from the encoder module 120 and the gyroscope module 110 according to a Kalman filter method, which uses the covariance of system noise and that of measurement noise calculated through evolutionary computation. Particularly, the control module 140 localizes the mobile robot by applying the covariance of system noise and that of measurement noise, which satisfy the condition that no Kalman filter parameter diverges during evolutionary computation, to a Kalman filter method.

After localizing the mobile robot, the control module 140 operates the drive module 130 accordingly so that the mobile robot is moved.

The Kalman filter parameters include the scale factor of wheels and the wheel base distance. As used herein, divergence refers to a state wherein a parameter exceeds a predetermined critical range. More particularly if the value of a parameter calculated in an evolutionary computation exceeds a critical range predetermined for that parameter, it is considered divergent.

In an evolutionary computation, values (covariance of specific system noise and that of specific measurement noise) assigned to offspring in each step are modified so as to calculate error, which is the difference between a true value obtained from experiments and a value obtained from a Kalman filter. The control module 140 applies the covariance of system noise and that of measurement noise to a Kalman filter method, when the average error calculated in the evolutionary computation is a minimum.

For example, when 10 experiments are performed for each individual in an evolutionary computation, 10 values of error between a true value and a value obtained from a Kalman filter are calculated together with corresponding mean value. The evolution is directed in such a direction that individuals having small average error are likely to be selected in each generation. The error is defined as a root mean square of the difference between a true value and a value obtained from a Kalman filter. The error includes error in distance and angle of the robot.

When a parameter of a Kalman filter diverges in an evolutionary computation, the error for each offspring can be replaced with a predetermined value, which is any large value, so that the average error of a generation, which has the divergent parameter, is larger than that of a generation which has not. This reduces the possibility that the covariance of system noise and that of measurement noise of the generation, which has the divergent parameter, will be applied to the Kalman filter method.

The covariance of system noise and that of measurement noise, which are applied to the Kalman filter method, may be obtained by performing the computation of a specific experiment, which causes a Kalman filter parameter to diverge in an evolutionary computation based on a plurality of experiments for plurality of offspring, at the beginning of a following evolutionary computation (i.e., computation of next generation).

According to an exemplary embodiment of the present invention, the evolution computation is conducted in such a manner that, when a specific experiment has a divergent Kalman filter parameter while performing computation for each generation, the following computation is omitted. This avoids unnecessary computation by preferentially performing computation of an experiment regarding specific offspring, which have high possibility of divergence with regard to a corresponding individual. The experiment, as used herein, is performed by causing a robot to run (move) in a specific path. For example, the robot may rotate or reciprocate in a specific space. It is to be noted that, in this case, the experiments may be considered different even when the robot runs in the same path. A detailed description of evolutionary computation together with rearrangement of experiment order will be given later with reference to FIG. 7.

Figure 2:
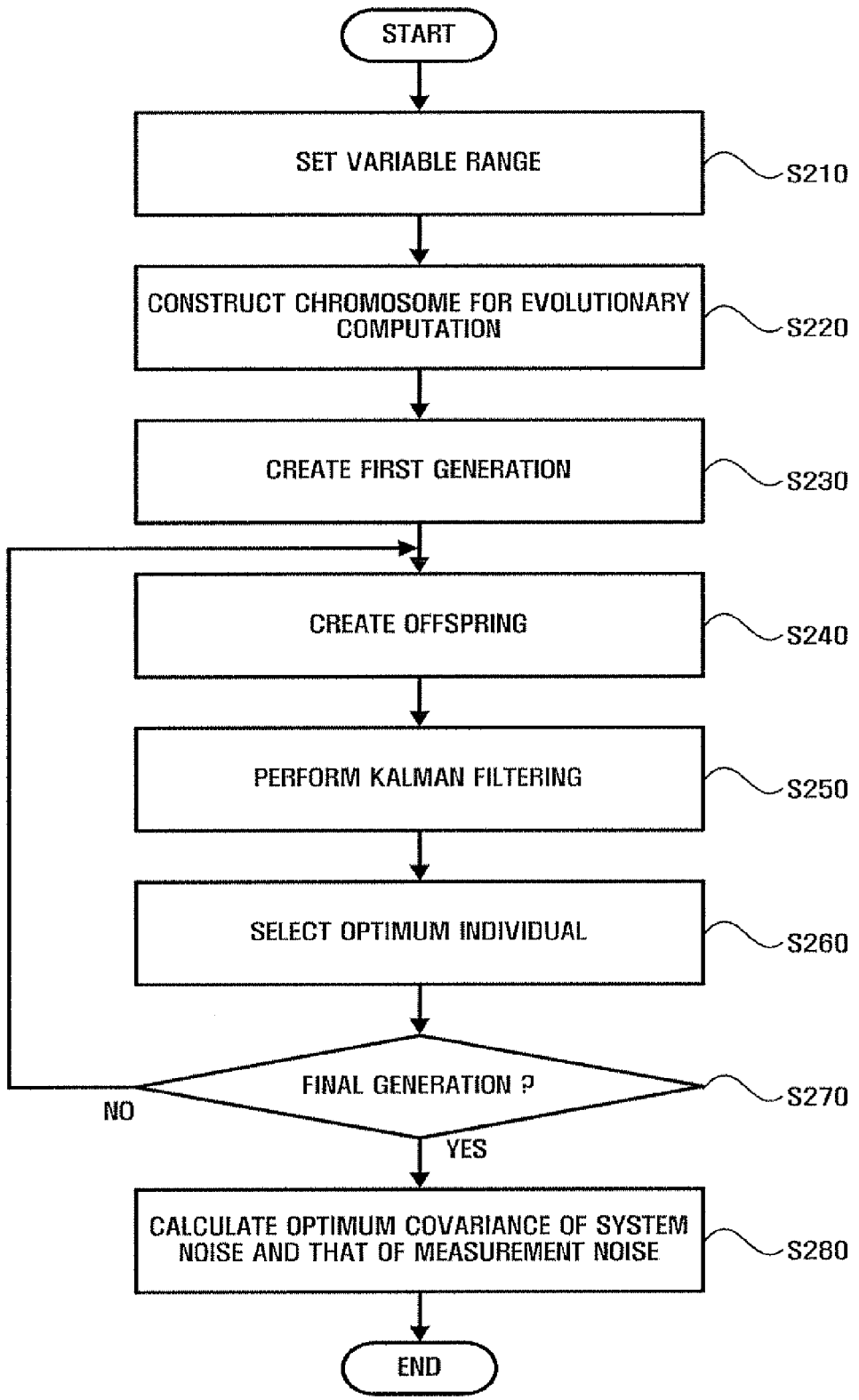
FIG. 2 is a flowchart showing steps for calculating the covariance of system noise and that of measurement noise according to an exemplary embodiment of the present invention.

FIG. 2 is a flowchart showing steps for calculating the covariance of system noise and that of measurement noise according to an exemplary embodiment of the present invention.

In order to calculate the noise of a robot, the range of variables is set S210. Particularly the maximum value of covariance of a Kalman filter is inputted, so is the range of parameters. The inputted range of parameters is used to determine whether or not the parameters diverge in a corresponding step.

After the range of variables is set, chromosomes are constructed for the covariance of system noise and that of measurement noise for the purpose of evolutionary computation (S220), as defined by equation (2) below.

$$x_{i,t}=[q_{i,1}q_{i,2}\ldots q_{i,n}r_{i,1}r_{i,2}\ldots r_{i,m}S_{i,1}S_{i,2}\ldots S_{i,N}]^T \quad (2)$$

Wherein, x refers to the individual of a chromosome; q refers to a chromosome for the covariance of system noise; r refers to a chromosome for the covariance of measurement noise; S refers to an experiment; i refers to the number of individuals; and t refers to the number of generations.

Thereafter, a first generation is created S230. Particularly, the initial value is set for the offspring of a first generation by determining the covariance of system noise and that of measurement noise in a normal random manner within the range, which has been set in step S210, and determining the order of experiment in a uniform random manner.

After the first generation is created, offspring of the first generation are created S240. Particularly, values of the covariance of system noise and that of measurement noise are determined. Offspring creation can be defined by equation (3) below.

$$\sigma_{i,t}=\sigma_{i,t-1}\cdot\exp(\tau'\cdot N(0,1)+\tau\cdot N_i(0,1))$$

$$x_{i,t}=x_{i,t-1}+\sigma_{i,t}\cdot N_i(0,1) \quad (3)$$

Wherein, σ refers to the distribution of probability that the value of offspring can be determined. The order of experiment may be rearranged while offspring are created. Particularly, when a parameter of a Kalman filter diverges while an experiment is performed in a specific order, the experiment is given the top priority.

After the offspring are created, Kalman filtering is performed for each offspring S250, in order to confirm whether or not any parameter of the Kalman filter diverges. When no parameter diverges, the difference between a true value and a value obtained from the Kalman filter is inputted as the error for the corresponding offspring. When a parameter diverges, any large predetermined value is inputted as the error for the corresponding offspring. This process is repeated until the Kalman filtering is performed for each experiment. A detailed description of the Kalman filtering will be given later with reference to FIG. 3.

After the Kalman filtering is finished, individuals having small error are chosen S260. Particularly, individuals having small error are selected from individuals of the offspring, which have been created in the offspring creation process, and individuals of the parent generation. For example, when there are 30 individuals, the number of individuals of the parent generation is added to that of offspring and totals 60 individuals, from which optimum 30 individuals are chosen. A probable method, such as a random roulette wheel, may be used to this end.

After optimum individuals are selected, it is confirmed whether or not the evolution computation has been performed until the final generation S270. If not, the evolutionary computation is conducted for a new generation. After the last generation has been covered, optimum covariance of system noise and that of measurement noise are calculated S280.

The covariance of system noise and that of measurement noise, which have been calculated in this manner, are applied to the mobile robot and used to localize it.

FIG. 3 is a flowchart showing a Kalman filtering process according to an exemplary embodiment of the present invention. Although the Kalman filtering process may be performed by using a conventional Kalman filter, it is assumed in the present invention that a Kalman filter having constraints is used.

As a first step of the Kalman filtering process, state variables are predicted S310. According to the present invention, new state variables are added to a conventional state equation so that the size of rank of the observability matrix increases.

An indirect Kalman filter based on a conventional state equation has poor observability. Particularly, although the state vector of conventional state equations has a dimension of 9, the rank of the observability matrix is merely 2 under an assumption that the state transition matrix is in a steady state of a time-invariant system. Therefore, it is impossible to confirm whether or not convergence will occur. More particularly it is impossible to confirm whether or not a state, such as the error in position of the robot, will converge to a true value, because a rotational angle state is solely included in the observability matrix. Even when the system is time-varying, it is still considered unstable, because the rank of the observability matrix is 6.

Therefore, in order to solve this problem, the present invention introduces an observable system state for prediction.

In general, the observability matrix of a dynamic system model, such as a robot, in a discrete-time interval can be defined by equation (4) below.

$$O(H_k, F_k, 1 \le k \le k_f) = \sum_{k=1}^{k_f} \left[\prod_{i=0}^{k-1} F_{k-i}\right]^T H_k^T H_k \left[\prod_{i=0}^{k-1} F_{k-i}\right] \quad (4)$$

Wherein, $H_k$ refers to an observation matrix at time k, and $F_k$ refers to a state transition matrix from k to (k+1) for $1 \le k \le k_f$.

When the state transition matrix of the robot is time-invariant, the observability can be determined by a rank of the matrix defined by equation (5) below.

$$O=[H^T F^T H^T (F^T)^2 H^T \ldots (F^T)^{n-1} H^T] \quad (5)$$

The system is regarded observable if the rank of equation (5) is n, which corresponds to the dimension of the system state vector.

As mentioned above, according to the prior art, the rank is 2, which indicates that the robot system is not fully observable. The present invention uses a gyroscope and encoders for both wheels so that location of the robot, in which rotational angle of the gyroscope is reflected, is observable.

The location and heading angle $\phi(k)$ of the robot can be defined by equation (6) below.

$$\hat{X}_G(k+1) = \hat{X}_G(k) + \cos\hat{\phi}(k) \times \left(\frac{(1+S_R(k))U_R(k) + (1+S_L(k))U_L(k)}{2}\right) \quad (6)$$

$$\hat{Y}_G(k+1) = \hat{Y}_G(k) + \sin\hat{\phi}(k) \times \left(\frac{(1+S_R(k))U_R(k) + (1+S_L(k))U_L(k)}{2}\right)$$

$$\hat{X}_G(k) = X(k) + \delta X_G(k)$$

$$\hat{Y}_G(k) = Y(k) + \delta Y_G(k)$$

Wherein, $\hat{X}_G(k)$ and $\hat{Y}_G(k)$ refer to estimated location of the robot based on calculated rotational angle of the gyroscope, $\delta X_G(k)$ and $\delta Y_G(k)$ refer to error in location of the robot estimated by the gyroscope, and $\phi$ refers to the rotational angle of the gyroscope.

By adding the $\delta X_G(k)$ and $\delta Y_G(k)$ to the conventional state equation as new state variables, the state equation is modified as shown in FIG. 4, wherein reference numeral 410 indicates newly added state variables, and reference numeral 420 indicates a newly added portion of the system matrix.

State estimation based on FIG. 4 is defined by equation (7) below.

$$\hat{x}_k^- = f(x_{k-1}, u_k, 0)$$

$$P_k^- = A_k P_{k-1} A_k^T + Q_k \quad (7)$$

Wherein, x refers to a state variable in FIG. 4; u refers to a velocity component of the robot; A refers to matrix F in FIG. 4; P refers to a covariance matrix; Q refers to the covariance of system noise; and $A_k = \partial F/\partial x(x_k, u_k, 0)$.

Based on a state equation having estimated state variables, as shown in FIG. 4, the state is observed S320.

A measurement equation may be used to this end. A measurement equation according to the present invention is briefly defined by equation (8) below and is embodied in FIG. 5.

Measurement equation=location of robot estimated by encoder−location of robot estimated by gyroscope+noise (8)

In FIG. 5, v refers to measurement noise.

A measurement equation according to the prior art is defined by equation (9) below and shown in FIG. 6. It is clear from FIG. 6 that only an angular state is included in the observation matrix H.

Measurement equation=direction of robot estimated by encoder−direction of robot estimated by gyroscope+noise (9)

In FIG. 6, v refers to measurement noise.

In contrast, the observation matrix H of the measurement equation according to the present invention, shown in FIG. 5, includes not only an angular state, but also a state regarding location of the robot. As a result, the rank of the observability matrix, as defined by equation (4), is improved.

Particularly, according to the inventive method, rank (O)=4, in the case of a time-invariant system. This satisfies such a condition that error in x, y distances converge to a true value. In the case of a time-varying system, rank (O)=10, thereby stabilizing the system. It is to be noted that state variable $\delta B_s(k+1)$ of FIG. 4 corresponds to error in scale factor of the gyroscope. That variable is related to preceding correction and is excluded when the rank is calculated.

After observing the state of the robot in Step 320 and obtaining $Z_k$ including observation matrix H (in this case, H and $Z_k$ refer to H and Z shown in FIG. 6, respectively), Kalman gain is obtained based on H. The Kalman gain and $Z_k$ are used to update the state variable x and covariance P in equation (7) (S330), as defined by equation (10) below.

$$K_k = P_k^- H_k^T (H_k P_k^- H_k^T + R_k)^{-1}$$

$$\hat{x}_k = \hat{x}_k^- + K_k(z_k - h(\hat{x}_k^-, 0))$$

$$P_k = (I - K_k H_k) P_k^- \quad (10)$$

Wherein, $K_k$ refers to Kalman gain, $R_k$ refers to the covariance of measurement noise, and $H_k = \partial h/\partial x(x_k, u_k, 0)$.

It is confirmed whether or not the mobile robot has constraints S340. When the mobile robot has no constraints, state variable $\hat{x}_k$, which has been updated in step S330, is used to localize the mobile robot, and step S310 is repeated.

When the mobile robot has constraints, state variable $\hat{x}_k$, which has been updated in step S330, is amended in conformity with the constraints so that, based on the amended constraints, the mobile robot is localized S350.

The constraints of the mobile robot, which has a gyroscope loaded thereon, include wheel base distance, wheel diameter, as well as scale factor and bias of the gyroscope resulting from temperature change. In addition, the constraints may include linear constraints, non-linear constraints, inequality constraints, and equality constraints.

Step S350 includes a step for updating state variable $\hat{x}_k$ by using constraints and a step for updating a penalty parameter and a Lagrange multiplier.

It has been assumed that the present invention is directed to a Kalman filter problem with constraints. In order to solve this, a state variable without constraints is projected onto a constraint plane so that a solution is obtained.

Particularly, with constraints g and h, a solution is obtained from equation (11) below, under a condition of $g_i(x) \leq 0$ and $h_j(x)=0$.

$$\min_x f(x) = (x - \hat{x})^T W(x - \hat{x}) \quad (11)$$

Wherein, $g_i(x)$ refers to inequality constraints; $h_j(x)$ refers to equality constraints; $\hat{x}_k$ refers to a Kalman-filtered state; and W refers to any positive definite matrix, such as identity matrix or system noise covariance matrix.

In the case of a constrained optimization problem, such as equation (11), the necessary condition for the existence of a state, which locally minimizes it, is a Lagrange multiplier. Conventional Kuhn-Tucker optimality conditions can provide such a condition.

Above equation (11) corresponds to a convex problem, and conventional penalty function theorem can be applied to equation (11).

The penalty function theorem states that, when penalty parameter $s_k$ gradually increases in a convex problem, the solution of a Lagrangian function converges to an optimal solution. The resulting penalty function is defined by equation (12) below.

$$x_k = -2W^T(x_k - \hat{x}_k) - \left[ \sum_i \nabla g_i(s_k g_i^+ + \lambda_i) + \sum_j \nabla h_j(s_k h_j + \mu_j) \right] \quad (12)$$

Wherein, $\lambda_i = \epsilon s_k g_i^+$, $\mu_j = \epsilon s_k h_j$, $s_k = (1+\alpha)s_{k-1}$, $\alpha \geq 0$, $\epsilon \geq 0$. In addition, $\hat{x}_k$ refers to a state variable updated in step S330; $x_k$ refers to a state variable updated by using constraints; g refers to inequality constraints; h refers to equality constraints; s refers to a penalty parameter; and $\lambda$ and $\mu$ refer to Lagrange multipliers.

The penalty parameter s can be selected based on the above-mentioned penalty function theorem.

A process for updating the penalty parameter s and Lagrange multipliers $\lambda$ and $\mu$ will now be described.

Initially, $\epsilon=0$, $\alpha$=positive constant, and, after a predetermined time, $\epsilon$ is also modified into a small positive constant, so that s, $\lambda$, $\mu$ are updated. If necessary, $\alpha$ may be modified into another positive constant after a predetermined time, in order to improve the convergence rate.

In summary, as defined by equation (12), update of a Kalman filter, which has constraints, satisfies both Kuhn-Tucker optimality conditions and penalty function theorem and is regarded as an optimal solution.

Figure 7:
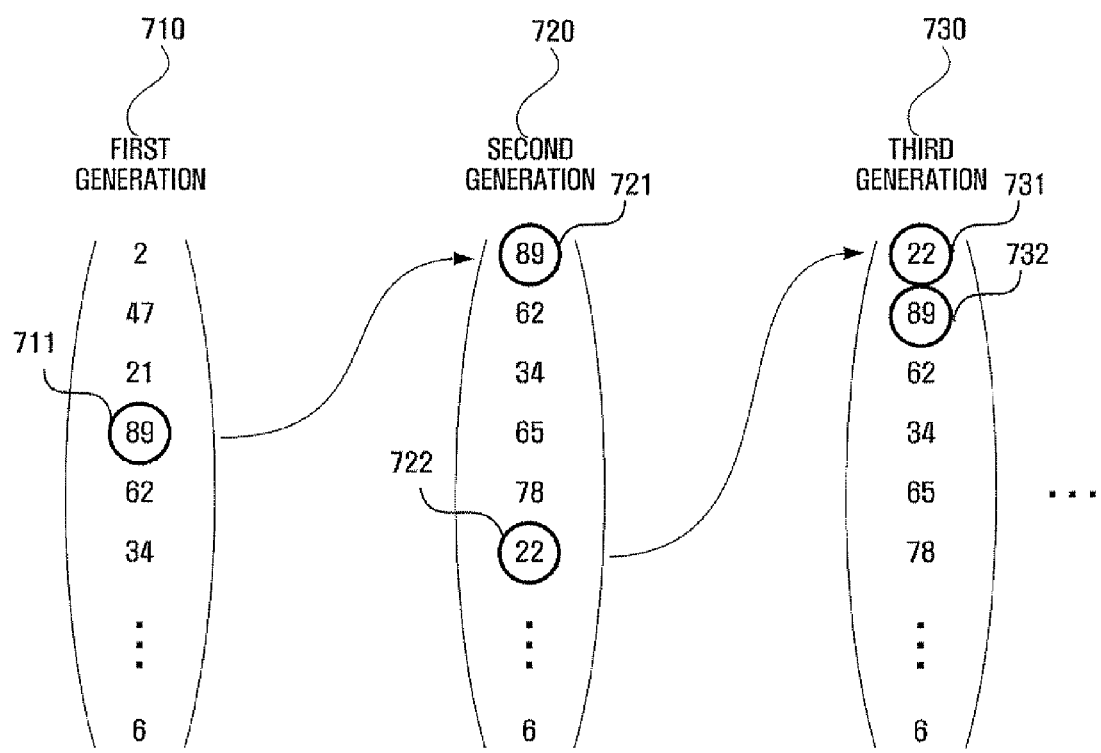
FIG. 7 is a conceptual diagram showing the rearrangement of experimental order of offspring in an evolutionary computation according to an exemplary embodiment of the present invention.

FIG. 7 is a conceptual diagram showing the rearrangement of experiment order of offspring in an evolutionary computation according to an exemplary embodiment of the present invention.

The experiment order during evolutionary computation can be rearranged according to whether or not a parameter of the Kalman filter diverges, as mentioned above.

For example, 100 experiments are arranged in a predetermined order in the case of a first generation 710, as shown in FIG. 7. Experiments are performed in the same order as they are arranged so as to confirm the convergence of a parameter of the Kalman filter, based on whether or not the parameter is included in a predetermined critical range. Particularly, if a parameter falls out of the critical range or exceeds it by several or hundreds of times, it is considered divergent. The factor used to determine the range may be predetermined by the user.

If it is confirmed that the $89^{th}$ experiment 711 of the first generation 710 causes a parameter to diverge, the $89^{th}$ experiment 711 is arranged at the top of the next generation, i.e. second generation 720. In the evolutionary computation of the second generation 720, the $89^{th}$ experiment 721 is preferentially subjected to a divergence test.

According to the present invention, when a divergent experiment is found in the evolutionary computation, the task proceeds to the next generation. Then, an experiment having a high possibility of divergence, such as the $89^{th}$ experiment 711, is preferentially tested to confirm its divergence in the next generation process. This avoids unnecessary tasks and reduces the computation time.

If it is confirmed that the $89^{th}$ experiment 721 has no divergent parameter in the computation of the second generation 720, the next experiment is subjected to a divergence test. When it is confirmed that $22^{nd}$ experiment has a divergent parameter, the $22^{nd}$ experiment is arranged at the top of the next generation, i.e. third generation 730. In the evolutionary computation of the third generation 730, the $22^{nd}$ experiment 731 is preferentially subjected to a divergence test. Then, the $89^{th}$ experiment 732 is tested to confirm its convergence.

As mentioned above, a robot and a method for localizing the robot by using a calculated covariance according to the present invention have at least one advantage, as follows.

Firstly, when the covariance of system noise and that of measurement noise are calculated in an evolutionary computation, the computation is restricted to offspring, which do not cause any Kalman filter parameter to diverge. In addition, when experiments are performed to calculate the error of a Kalman filter value with regard to a true value, the error regarding offspring of a previous experiment, which have undergone divergence, is calculated at the beginning of the next experiment process. This reduces the computation time.

Secondly, a Kalman filter is applied so as to satisfy conventional nonlinear constraints. This improves the system stability.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include wireless transmission media including a carrier wave transmitting signals specifying instructions, data structures, data files, etc. communicating with an access point coupled to a computing device or network. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

The computer readable code/instructions and computer readable medium/media may be those specially designed and constructed for the purposes of the present invention, or they may be of the kind well-known and available to those skilled in the art of computer hardware and/or computer software.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A robot comprising:
a gyroscope module to provide rotational angle of the robot;
an encoder module to provide velocity and value related to rotational angle of a wheel by sensing motion of the wheel; and
a controller to estimate a current location according to a Kalman filter, to which a covariance of system noise and measurement noise calculated in an evolutionary computation are applied, based on the rotational angle of the robot, velocity, and value related to rotational angle of the wheel,
wherein the control module applies the covariance of system noise and measurement noise to the Kalman filter in order to satisfy a condition where no Kalman filter parameter diverges in the evolutionary computation,
wherein the covariance of system noise and the covariance of measurement noise are calculated by preferentially performing computation of a trial for obtaining measurements when the robot is caused to move in a specific path in a following evolutionary computation, the trial causing the Kalman filter parameter to diverge, in the evolutionary computation regarding a plurality of trials.

2. The robot of claim 1, wherein the condition where no Kalman filter parameter diverges in the evolutionary computation is that the Kalman filter parameter does not exceed a predetermined critical range.

3. A robot comprising:
a gyroscope module to provide rotational angle of the robot:
an encoder module to provide velocity and value related to rotational angle of a wheel by sensing motion of the wheel; and
a controller to estimate a current location according to a Kalman filter, to which a covariance of system noise and measurement noise calculated in an evolutionary computation are applied, based on the rotational angle of the robot, velocity, and value related to rotational angle of the wheel,
wherein the covariance of system noise and the covariance of measurement noise are applied to the Kalman filter by the control module when error calculated in the evolutionary computation has a smallest mean value,
wherein the covariance of system noise and the covariance of measurement noise are calculated by preferentially performing computation of a trial for obtaining measurements when the robot is caused to move in a specific path in a following evolutionary computation, the trial causing the Kalman filter parameter to diverge, in the evolutionary computation regarding a plurality of trials.

4. A robot comprising:
a gyroscope module to provide rotational angle of the robot;
an encoder module to provide velocity and value related to rotational angle of a wheel by sensing motion of the wheel; and
a controller to estimate a current location according to a Kalman filter, to which a covariance of system noise and measurement noise calculated in an evolutionary computation are applied, based on the rotational angle of the robot, velocity, and value related to rotation angle of the wheel,
wherein the covariance of system noise and the covariance of measurement noise are applied to the Kalman filter by the control module when the predetermined value which replaces an error calculated in the evolutionary computation when a Kalman filter parameter diverges in the evolutionary computation has a smallest mean value,
wherein the covariance of system noise and the covariance of measurement noise are calculated by preferentially performing computation of a trial for obtaining measurements when the robot is caused to move in a specific path in a following evolutionary computation, the trial causing the Kalman filter parameter to diverge, in the evolutionary computation regarding a plurality of trials.

5. The robot of claim 3, wherein the error comprises a root mean square between a true value calculated by a measurement obtained when the robot is caused to move in a specific path and a value calculated by a Kalman filter.

6. The robot of claim 3, wherein the error comprises error in distance and error in angle.

7. The robot of claim 1, wherein the Kalman filter has constraints with the Kalman filter parameter having a defined range.

8. The robot of claim 7, wherein the Kalman filter satisfies Kuhn-Tucker optimality conditions and the penalty function theorem.

9. The robot of claim 7, wherein the constraints are expressed as penalty functions.

10. The robot of claim 1, wherein the rotational angle of the robot comprises a heading angle of the robot.

11. The robot of claim 1, wherein the rotational angle of the wheel comprises a traveling distance of the wheel.

12. A method of localizing a robot by using a calculated covariance, comprising:
providing rotational angle of the robot;
providing velocity and value relating to rotational angle of a wheel by sensing motion of the wheel; and
estimating a current location according to a Kalman filter, to which a covariance of system noise and measurement noise calculated in an evolutionary computation are applied, based on rotational angle of the robot, velocity, and value related to rotational angle of the wheel,
wherein the covariance of system noise and measurement noise are applied to the Kalman filter in order to satisfy a condition where no Kalman filter parameter diverges in the evolutionary computation,
wherein the covariance of system noise and the covariance of measurement noise are calculated by preferentially performing computation of a trial for obtaining measurements when the robot is caused to move in a specific path in a following evolutionary computation, the trial causing the Kalman filter parameter to diverge, in the evolutionary computation regarding a plurality of trials.

13. The method of claim 12, wherein the Kalman filter parameter is considered divergent when the Kalman filter parameter exceeds a predetermined critical range.

14. The method of claim 12, wherein the estimating involves applying the covariance of system noise and the covariance of measurement noise to the Kalman filter when an error calculated in the evolutionary computation has a smallest mean value.

15. The method of claim 14, wherein the error is replaced with a predetermined value when the Kalman filter parameter diverges in the evolutionary computation.

16. The method of claim 14, wherein the error comprises a root mean square between a true value calculated by a measurement obtained when the robot is caused to move in a specific path and a value calculated by the Kalman filter.

17. The method of claim 14, wherein the error comprises error in distance and error in angle.

18. The method of claim 12, wherein the Kalman filter has constraints with the Kalman filter parameter having a defined range.

19. The method of claim 18, wherein the Kalman filter satisfies Kuhn-Tucker optimality conditions and the penalty function theorem.

20. The method of claim 18, wherein the constraints are expressed as penalty functions.

21. The robot of claim 12, wherein the rotational angle of the robot comprises a heading angle of the robot.

22. The robot of claim 12, wherein the rotational angle of the wheel comprises a traveling distance of the wheel.

23. At least one computer readable medium storing computer readable instructions that control at least one processor to implement the method of claim 10.

24. A robot comprising:
a control module to estimate a current location according to a Kalman filter, to which a covariance of system noise and measurement noise calculated in an evolutionary computation are applied, based on rotational angle of the robot, velocity, and value related to rotational angle of the wheel,
wherein the control module applies the covariance of system noise and measurement noise to the Kalman filter in order to satisfy a condition where no Kalman filter parameter diverges in the evolutionary computation,
wherein the covariance of system noise and the covariance of measurement noise are calculated by preferentially performing computation of a trial for obtaining measurements when the robot is caused to move in a specific path in a following evolutionary computation, the trial causing the Kalman filter parameter to diverge, in the evolutionary computation regarding a plurality of trials.

* * * * *

UNITED STATES PATENT AND TRADEMARK OFFICE
CERTIFICATE OF CORRECTION

PATENT NO. : 8,315,734 B2
APPLICATION NO. : 11/688983
DATED : November 20, 2012
INVENTOR(S) : Hyeon Myeong et al.

Page 1 of 1

It is certified that error appears in the above-identified patent and that said Letters Patent is hereby corrected as shown below:

Title Page, Item (56) Column 2 (Other Publications); Line 1; Delete "kenematic" and insert -- kinematic --, therefor.

In the Specification
Column 1; Line 9; Delete "Apr. 41," and insert -- Apr. 4, --, therefor.

In the Claims
Column 11; Line 54; In Claim 3, delete "robot:" and insert -- robot; --, therefor.

Signed and Sealed this
Sixteenth Day of July, 2013

Teresa Stanek Rea
*Acting Director of the United States Patent and Trademark Office*